(12) United States Patent
Sole et al.

(10) Patent No.: US 10,727,670 B2
(45) Date of Patent: *Jul. 28, 2020

(54) METHOD FOR DISTRIBUTING ENERGY IN A HOME ENERGY MANAGEMENT SYSTEM

(71) Applicant: Dr. Ing. h.c. F. Porsche Aktiengesellschaft, Stuttgart (DE)

(72) Inventors: Barry Sole, Stuttgart (DE); Ralf Oestreicher, Sindelfingen (DE); Helena Selle, Stuttgart (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 207 days.

This patent is subject to a terminal disclaimer.

(21) Appl. No.: 15/830,109

(22) Filed: Dec. 4, 2017

(65) Prior Publication Data

US 2018/0159326 A1 Jun. 7, 2018

(30) Foreign Application Priority Data

Dec. 5, 2016 (DE) .......................... 10 2016 123 424

(51) Int. Cl.
*G06Q 50/06* (2012.01)
*H02J 3/14* (2006.01)
(Continued)

(52) U.S. Cl.
CPC ................ *H02J 3/14* (2013.01); *B60L 53/64* (2019.02); *G05B 15/02* (2013.01);
(Continued)

(58) Field of Classification Search
CPC ...... H02J 3/14; H02J 2003/143; G05B 15/02; G05B 2219/2642
See application file for complete search history.

(56) References Cited

U.S. PATENT DOCUMENTS

| 7,873,441 B2 | 1/2011 | Synesiou et al. |
| 2012/0226572 A1* | 9/2012 | Park .......................... H02J 3/14 705/26.1 |

(Continued)

FOREIGN PATENT DOCUMENTS

| DE | 102016112249 A1 | 1/2018 |
| EP | 1263108 A1 | 12/2002 |

(Continued)

OTHER PUBLICATIONS

Indian Examination Report for Indian Application No. 201714038862, dated Oct. 18, 2019 with translation, 6 pages.

(Continued)

*Primary Examiner* — Mohammad Ali
*Assistant Examiner* — Vincent W Chang
(74) *Attorney, Agent, or Firm* — RatnerPrestia

(57) ABSTRACT

A method for distributing energy in the home energy management system including a central unit, an energy source, and an energy consumer. The central unit, the energy source, and the energy consumer are connected for exchanging information items. The central unit generates an information item which contains a first price information item and a first amount-of-energy information item for a predetermined period of time. The central unit transmits the information item to the energy consumer. The energy consumer ascertains a requirement information item taking into account the information item. The requirement information item contains a requested amount of energy for the predetermined period of time. The energy consumer transmits the requirement information item and a second price information item to the central unit. The central unit checks whether the overall requested amount of energy ascertained from the transmitted requirement information items at any one time exceeds the amount of energy available at this time. The (Continued)

central unit transmits the acknowledgment information item to the energy consumer.

10 Claims, 2 Drawing Sheets

(51) Int. Cl.
  *B60L 53/64* (2019.01)
  *G06Q 30/06* (2012.01)
  *G06Q 30/02* (2012.01)
  *G05B 15/02* (2006.01)
(52) U.S. Cl.
  CPC ..... *G06Q 30/0206* (2013.01); *G06Q 30/0611* (2013.01); *G06Q 50/06* (2013.01); *B60L 2240/80* (2013.01); *G05B 2219/2642* (2013.01); *H02J 2310/14* (2020.01); *H02J 2310/64* (2020.01); *Y02B 70/3225* (2013.01); *Y02B 70/3266* (2013.01); *Y04S 20/222* (2013.01); *Y04S 20/224* (2013.01); *Y04S 20/242* (2013.01)

(56) References Cited

U.S. PATENT DOCUMENTS

| | | | |
|---|---|---|---|
| 2012/0310433 A1* | 12/2012 | Littrell | ............. B60L 53/65 700/297 |
| 2014/0324237 A1* | 10/2014 | Oe | ............. G06Q 10/06 700/287 |
| 2016/0371796 A1* | 12/2016 | Chassin | ............. G06Q 50/06 |
| 2018/0012314 A1 | 1/2018 | Sole et al. | |

FOREIGN PATENT DOCUMENTS

| | | |
|---|---|---|
| KR | 20110052981 A | 5/2011 |
| KR | 20140052644 A | 5/2014 |

OTHER PUBLICATIONS

English translation of the Notice of Preliminary Rejection for Korean Application No. 10-2017-0165627, dated Mar. 15, 2019, 3 pages.

\* cited by examiner

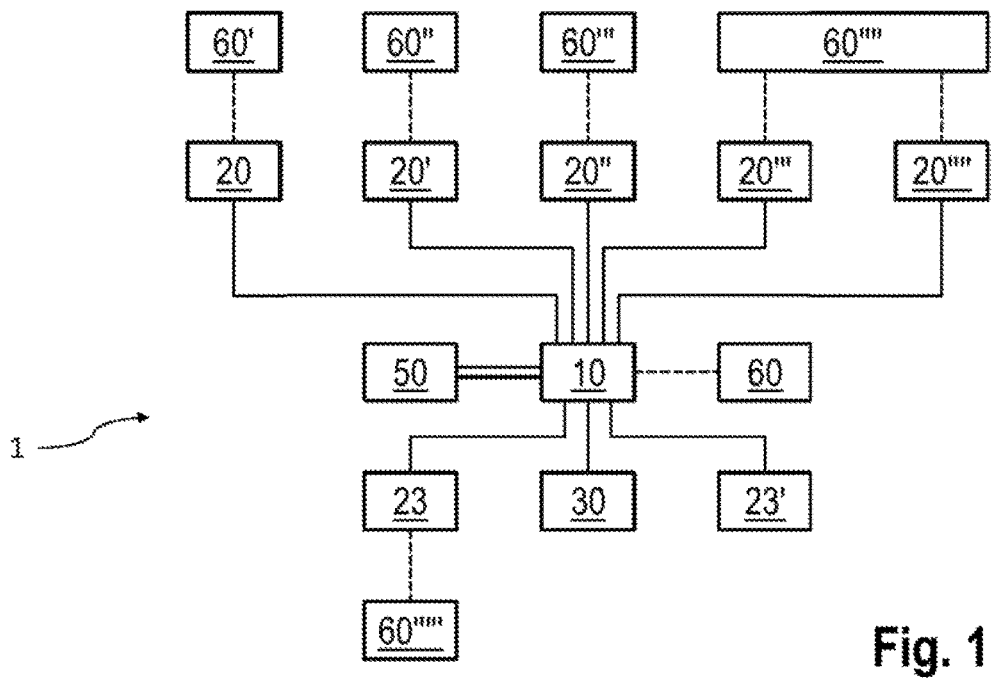
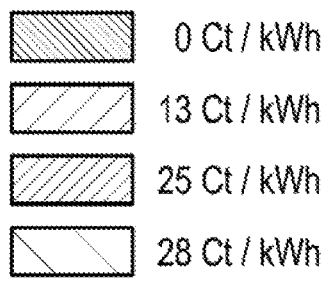
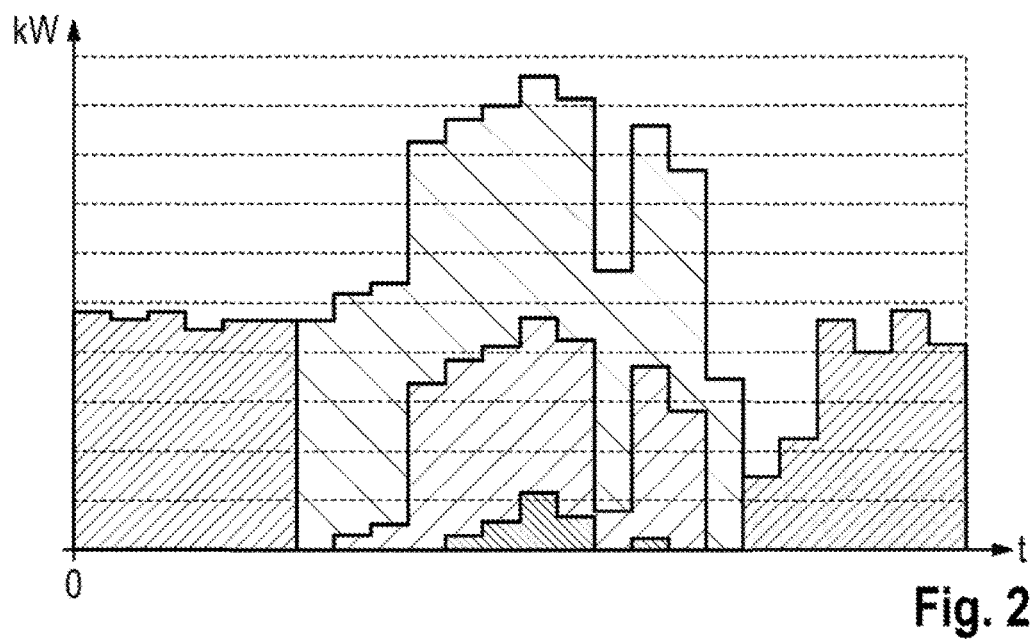
Fig. 1
Fig. 2

METHOD FOR DISTRIBUTING ENERGY IN A HOME ENERGY MANAGEMENT SYSTEM

CROSS-REFERENCE TO RELATED APPLICATIONS

This application claims priority to German Patent Application No. DE 10 2016 123 424.9, filed Dec. 5, 2016, which is incorporated by reference herein in its entirety.

FIELD OF THE INVENTION

The present invention proceeds from a method for distributing energy in a home energy management system comprising a central unit, an energy source, and at least one energy consumer, wherein the central unit, the energy source, and the energy consumer are connected to one another for exchanging information items.

BACKGROUND OF THE INVENTION

Such methods for distributing energy and such home energy management systems (HEMS) are already known from the prior art and serve not just to produce but to influence the flow and the distribution of energy. Renewable energies which provide varying amounts of energy over time are promoted for energy-political reasons. The amounts of energy generated thus are fed to the power grid, as a result of which the available energy is subject to varying prices over time. Furthermore, electric vehicles are promoted by the state in many countries for environmental-political reasons. Therefore, the situation arises that different amounts of energy are offered at different, prices over time and consumers require in part strongly varying amounts of energy over time. Thus, for example, a charging electric vehicle requires large amounts of energy over a relatively long period of time while a hairdryer requires only small amounts of energy over only a short period of time, whereas a building air-conditioning system in turn continuously requires slightly varying amounts of energy. Furthermore, consumers in part, have energy sources themselves, e.g. photovoltaic installations, said energy sources being able to provide varying amounts of energy over time.

Therefore, it is known that home energy management systems divide the available amounts of energy among energy consumers according to certain criteria. These known criteria include, inter alia, a rigid prioritization; thus, for example, a building air-conditioning system always has priority over a charging electric vehicle. Alternatively, it is known to uniformly divide the available amounts of energy among all energy consumers. Finally, it is likewise known to distribute the available amounts of energy according to the "first come, first served" principle, i.e. the first requesting energy consumer is provided with all the energy that is required and the remaining available a mount of energy is divided among the remaining energy consumers according to the sequence of the requests. These methods have many disadvantages. By way of example, it may be the case that a consumer requires mobility at certain times and therefore the charging of said consumer's electric vehicle benefits from a high priority at certain times but not at others, or that, in the case of mild temperatures, a building air-conditioning system can also be operated with reduced energy requirements but this is not possible in the case of significantly higher or lower temperatures. In each of these cases, a central unit or central intelligence, which may also be implemented in terms of software, decides alone about the distribution of the available amounts of energy without the energy consumer being able to influence this and, as a rule, without knowledge about why an energy consumer requests a certain amount of energy at a certain time or for what reason said consumer requires this energy.

International standards and protocols, for example SEP 2.0 EEBus or ISO 15118, were developed to standardize the data exchange in such home energy management systems. However, these standards or protocols have a restricted area of use and regulate the energy distribution by a central controller with a predetermined distribution logic in accordance with the aforementioned criteria, i.e. without information items about the states of the connected energy consumers being transmitted to the central unit.

SUMMARY OF THE INVENTION

It is therefore an object of the present invention to decentralize the HEMS prioritization logic, as it were by way of a "virtual manipulation" of the energy price, such that the various energy consumers themselves decide when and how they consume energy. This is elucidated using the example of two electric vehicles A and B, which are connected at midnight and require four hours for a complete charge. Electric vehicle A has a departure time of 6 a.m. and electric vehicle B has a departure time of 8 a.m. The HEMS cannot have any information relating to the time each electric vehicle needs for charging (i.e. how much energy it requires) or what their respective departure times are. A typical HEMS will blindly decide which vehicle is charged first by way of the priority and, for example, initially serve the electric vehicle that queries first. Thus, it may be the case that the electric vehicle B arrives first (even if only by one millisecond) and, as a consequence, the HEMS permits electric vehicle B to be charged before electric vehicle A. This could lead to the situation where electric vehicle A cannot be charged completely for lack of time because only two hours of charging time remain for it once electric vehicle B completes its charging process at 4 a.m.

However, if, instead, the HEMS were to virtually increase the energy price between midnight and 6 a.m., electric vehicle A would accept the higher price so that it could be charged between midnight and 4 a.m. By contrast, electric vehicle B would possibly only start charging at 4 a.m. in order to profit at least in part from the lower tariffs after 6 a.m. for the purposes of an increased cost efficiency.

As a result, the system would have been prioritized by a decentralized logic and a virtually manipulated energy price. The logic should be referred to as decentralized to the extent that the HEMS as such would only manipulate the energy price and each electric vehicle would adapt its consumption behavior to the—within this meaning—virtual energy price without further support from the HEMS.

What is important, here is that each involved device—whether this be a HEMS, an energy consumer or an energy producer—is able to initiate a figurative "renegotiation" at all times. Thus, for example, the HEMS could initiate a renegotiation because a second electric vehicle has arrived and needs to be charged. An electric vehicle itself could, in turn, introduce a renegotiation because its user has modified the departure time. During this renegotiation or re-planning, the consumer may selectively continue to receive energy according to the existing plan or suspend the consumption.

A potential problem of this approach is constituted, in particular, by the case that the HEMS identifies a resource conflict and centrally introduces such a renegotiation. In this scenario, all consumers may adapt their consumption plans in a corresponding manner within the scope of the renegotiation and, for example, shift their plans by the same time difference such that the resource conflict has not been lifted but only moved to a later time. Therefore, consumers themselves should be able to set a price at which they would be prepared to at least partly relinquish their consumption plan and renegotiate the relinquished part of their consumption plan.

This object is achieved by a method for distributing energy in a home energy management system comprising a central unit, at least one energy source, and at least one energy consumer, wherein the central unit, the energy source, and the energy consumer are connected to one another for exchanging information items, wherein, in a first step, the central unit generates an information item which contains at least one first price information item and at least one first amount-of-energy information item for a predetermined period of time, wherein, in a second step, the central unit transmits the information item to the energy consumer, wherein, in a third step, the energy consumer ascertains a requirement information item taking into account the information item, said requirement information item containing at least one requested amount of energy for the predetermined period of time, wherein, in a fourth step, the energy consumer transmits the requirement information item and a second price information item to the central unit, wherein, in a fifth step, the central unit checks whether the second price information item is consistent and whether the overall requested amount of energy ascertained from the transmitted requirement information items at any one time exceeds the amount of energy available at this time, wherein, in a sixth step, the central unit transmits an acknowledgment information item to the energy consumer if the second price information item is consistent and the overall requested amount of energy is less than or equal to the available amount of energy at all times, wherein the acknowledgment information item contains an information item regarding energy in accordance with the requirement information item being available for the energy consumer, or the method is carried out again if the second price information item is inconsistent or the overall requested amount of energy is greater than the available amount of energy at any one time, wherein the central unit generates the information item in the first step in such a way that it contains, at least in part, a third price information item, wherein the third price information item is different, in particular higher or lower, than the first price information item.

Within the meaning of this application, energy should be understood to mean e.g. an electric current. An energy consumer is preferably a household appliance, for example a refrigerator, a washing machine, a dishwasher and/or a hairdryer. Alternatively, the energy consumer is a heat pump, an illumination means and/or an electric vehicle. The second price information item is preferably virtual, i.e., in particular, it exists only within the home energy management system and only serves to distribute energy and does not lead to an actual bill within the home energy management system. Outside of the home energy management system, for example in multi-family dwellings or the Chinese equivalents thereof, the so-called compounds, the second price information item may serve for billing by ail means. The price information items are preferably prices for the energy that relate to a period of time and/or an amount of energy. In particular, the information item comprises a plurality of price information items and/or a plurality of a mount-of-energy information items. By way of example, at a specific time, a first price information item may be assigned to a first amount of energy and a second price information item may be assigned to a second amount of energy. In accordance with a further example, a first price information item is assigned to a first time internal and a second price information item is assigned to a second time interval. A combination of price information items relating to an amount of energy and a time interval is also possible. Here, a price information item is, in particular, a price. Preferably, the method comprises a plurality of energy consumers and/or a plurality of energy sources.

Here, the central unit has a plurality of options available for setting the second price information item. Preferably, the second price information item is ascertained with the aid of empirical values of the central unit. Expressed differently, the central unit is provided to be capable of learning in accordance with a preferred embodiment. As a result of this, it is advantageously possible to minimize the number of necessary iterations, even though the capability of learning of the HEMS is not mandatory for the basic concept of a prioritization that has been decentralized by price manipulation.

Particularly preferably, the central unit stores transmitted requirement information items and/or supply information items, in particular over a certain period of time. Hence, the central unit can advantageously resort to stored data, i.e., in particular, to first price information items and/or second price information items, in order, at a specific time and/or for certain energy consumers, to ascertain a second price information item that lies as closely as possible to a final second price information item, i.e. a second price at which the demand no longer exceeds the supply. Alternatively, or additionally, the central unit ascertains the second price information item by virtue of adding a fixed value, in particular a value that increases step-by-step or exponentially, to the previous first price information item or second price information item. Here, it is important to note that said concept is by no means restricted to merely two prices but instead is able to operate with a plurality of prices. By way of example, the energy price at 1 p.m. could be €0.10/kWh for consumption up to 5 kW, €0.15/kWh for consumption between 5 and 10 kW, €0.20/kWh for consumption between 1.0 and 20 kW, etc. Instead of the drawn power, the price could also depend on the time of drawing, for example €0.10/kWh between 1 p.m. and 1:15 p.m., €0.15/kWh between 1:15 p.m. and 1:30 p.m., and €0.20/kWh between 1:30 p.m. and 1:45 p.m. Finally, a dependence, of the price on any combination of the aforementioned power and time criteria can be considered.

The method according to aspects of the invention is advantageous over the prior art in that a simple, in particular auction-based pricing mechanism comes to bear in the case where energy demand at a certain time exceeds an energy supply at this time, said pricing mechanism allowing each energy consumer themselves to undertake a prioritization in accordance with predetermined parameters and, accordingly, independently adapt the energy consumption. As a consequence, it is not mandatory for additional information items beyond price and amounts of energy to be exchanged between the central unit and the energy consumer, for example the type or priority of the energy consumer, advantageously facilitating a home energy management system with a simple design having an exchange of information items implemented in a simple manner. Thus, the method advantageously allows the energy consumers to independently adapt their operation and, as a consequence, ensures a stable energy supply in the home energy management system.

Advantageous configurations and developments of the invention can be gathered from the dependent claims and the description, with reference being made to the drawings.

Unless something else is Stated explicitly or absolutely necessary from a logical point of view, the sequence of the individual steps is arbitrary, independently of their nomenclature. In particular, for example, a ninth step may take place before or at the same time as the first step, or vice versa. Preferably, the first step is provided in time, in particular at least in part, before the second step, the second step is provided before the third step, the third step is provided before the fourth step, the fourth step is provided before the fifth step, and/or the fifth step is provided before the sixth step. In particular, this means that the method according to aspects of the invention can be initiated at any time by any component, i.e. the central unit, any energy consumer, and/or any energy source.

In accordance with a preferred embodiment, provision is made, in a seventh step for the energy source to generate a supply information item containing the maximum amounts of energy that are providable for the predetermined period of time, wherein, in an eighth step, the energy source transmits the supply information item to the central unit, wherein the central unit preferably takes the supply information item into account when generating the information item in the first step and/or when carrying out the check in the fifth step, wherein the seventh step and/or the eighth step, in particular, are carried out before the first step. As a result of this, it is advantageously possible also to include (local) energy sources in the energy distribution method and, in particular, allow the energy sources to adapt the energy production depending on the energy demand. Preferably, the energy source is a photovoltaic installation, in particular comprising a solar inverter.

In accordance with a preferred embodiment, an energy source is, at least from time to time, an energy consumer. Thus, it is possible, for example, that an energy source is a battery which provides energy when required but which stores energy in the case of very low demand and/or a very high energy supply, i.e. it acts as an energy consumer. Another example is a so-called smart meter which establishes a connection to external energy supply system, for example a current supply network, wherein the external energy supply system is an energy source or an energy consumer depending on supply and demand and the smart meter acts as a central unit. By way of example, the external energy supply system may provide energy at a predetermined price or receive energy, for example energy that is produced by a photovoltaic installation and not required. As a result of this, it is possible in a particularly advantageous manner to provide a flexible and dynamic method.

In accordance with a preferred embodiment, provision is made, in a partial step before the first step, for the energy consumer to transmit a request for information to the central unit. Particularly preferably, provision is made, in a partial step before the seventh step, for the central unit to transmit a request for the supply information item to the energy source. This advantageously renders initiation of the method according to aspects of the invention possible by any system component, i.e., for example, an energy consumer. As a result, e.g. an energy consumer can react to a change in its situation. Thus, for example, an electric vehicle can bring about a new distribution if a planned departure time is changed.

Preferably, the energy consumer and/or the energy source independently adapt their operation on the basis of the information items transmitted by the central unit, in particular on the basis of the transmitted price information items. Particularly preferably, provision is made for the energy consumer to reduce or increase its energy consumption, in particular switch itself on or off. A corresponding statement applies to the energy source, which preferably adapts its operation depending on the price, in particular switches itself on or off or regulates energy production. As a result of this, it is advantageously possible for the energy consumer and/or the energy source to independently regulate their operation only on the basis of information items that are accessible to them.

Very particularly preferably, the adaptations are carried out depending on the predetermined prioritizations and/or parameters. Thus, it is possible, for example that an energy consumer takes up or requires at least one sufficient amount of energy to maintain a minimal operation. Alternatively and optionally, provision is made for an energy consumer to have a certain maximum and/or minimum price, at which it should draw energy. (By no means should this be considered a mandatory precondition for carrying out the invention: by way of example, if two devices do not have a maximum or minimum price and always attempt to draw energy independently of the virtual price, the HEMS will ultimately have to resort to a traditional form of prioritization and will itself have to determine which device should be fed first, or will introduce independent parameters.) A corresponding statement applies to an energy source. By way of example, the consumer can prescribe that an electric vehicle has a different energy uptake behavior depending on its charge state. Thus, it is possible that an electric vehicle above a predetermined charge state should only receive energy if the price falls under a certain threshold and/or that the electric vehicle should take up energy at any price at a different predetermined charge state in order to ensure a minimum functionality.

In accordance with a preferred embodiment, provision is made for the information item, the requirement information item, and/or the supply information item only to contain at least one price information item and/or at least one amount-of-energy information item for the predetermined period of time. Particularly preferably, that information item, the requirement information item, and/or the supply information item contain a plurality of price information items and/or a plurality of amount-of-energy information items. As a result of this, it is advantageously possible to apply the distribution method according to aspects of the invention to complex energy prices as well.

In accordance with a preferred embodiment, provision is made, in a ninth step before the first step and/or the third step, for the energy consumer to ascertain the amount of energy to be requested, which forms the basis for the requirement information item. As a result of this, it is advantageously possible for the energy consumer to initially ascertain the amount of energy that is currently required and/or required over a specific period of time before said energy consumer directs a request to the central unit.

In accordance with a preferred embodiment, provision is made for the communication, i.e. the information and/or data exchange, between the central unit and the energy consumer and/or the energy source to be carried out in a wired or wireless manner, particularly preferably via an Internet-protocol-based method and/or a bus system, in particular a CAN bus. Very particularly preferably, the communication is carried out via a public and/or private network and/or via the Internet. In particular, communication is carried out pursuant to the ISO 15118 standard.

In accordance with a preferred embodiment, provision is made for the system also to comprise energy consumers and/or energy sources that are not capable of exchanging data with the central unit. In this case, provision is very preferably made for the central unit to measure the amount of energy required by the energy consumer and/or the amount of energy made available by the energy source and, in particular, create a requirement information item and a supply information item, respectively. As a result of this, it is possible in a particularly advantageous manner also to integrate relatively old energy consumers or energy sources into the system and take these into account within the scope of the energy distribution method.

A person skilled in the art understands that the central unit distributes the amount of energy for such an energy consumer and/or for such an energy source on the basis of predetermined criteria as said energy consumer and/or said energy source cannot actively participate in the method. Preferably, to this end, the central unit resorts to methods that were mentioned at the outset and are known from the prior art.

A further subject of the present invention is a home energy management system comprising a central unit, at least one energy source, and at least one energy consumer, wherein the central unit, the energy source, and the energy consumer are connected to one another for exchanging information items, wherein the home energy management system is configured to carry out a method according to aspects of the invention.

As a result of this, it is advantageously possible to provide a compact home energy management system in which the central unit need not have available more in depth information items about the energy consumers, as a result of which the central unit can advantageously have a simple design and be particularly compatible with a multiplicity of energy consumers. As a result, the home energy management system according to aspects of the invention can have a simple and compact design in a particularly advantageous manner and accordingly be realized in a cost-effective manner. Particularly preferably, a plurality of home automation systems may be linked, for example connected in succession, wherein an energy consumer then, in particular, is a further central unit of a further home automation system.

In accordance with a preferred embodiment, provision is made for the home energy management system to comprise an apparatus, wherein the apparatus comprises the central unit, the energy source, and/or the energy consumer. Particularly preferably, the apparatus is a home charging device, in particular for an electric vehicle. As result of this, it is advantageously possible to provide a home energy management system with a particularly compact design.

A further subject of the present invention is a computer program comprising a machine-readable program code, wherein the program code, if it is executed in a home energy management system, in particular in a central unit, an energy source, and/or an energy consumer, prompts the home energy management system, in particular the central unit, the energy source, and/or the energy consumer, to carry out a method according to aspects of the invention.

A further subject of the present invention is a computer program product for distributing energy in a home energy management system wherein the computer program product comprises a computer program which is provided on a storage medium, wherein the computer program comprises a machine-readable program code, wherein the program code, if it is executed in a home energy management system, in particular in a central unit, an energy source, and/or an energy consumer, prompts the home energy management system, in particular the central unit, the energy source, and/or the energy consumer, to carry out a method according to aspects of the invention.

In respect of possible advantageous embodiments, reference is made to the explanations in respect of the method according to aspects of the invention, which likewise apply to this subject, and vice versa.

BRIEF DESCRIPTION OF THE DRAWINGS

Further details, features and advantages of the invention emerge from the drawings and the following description of preferred embodiments on the basis of the drawings. Here, the drawings merely illustrate exemplary embodiments of the invention, which do not restrict the essential inventive concept.

FIG. 1 shows a home energy management system in accordance with an exemplary embodiment of the present invention.

FIG. 2 shows a graphical illustration of an information item in accordance with an exemplary embodiment of the present invention.

DETAILED DESCRIPTION OF THE INVENTION

Figure 3:
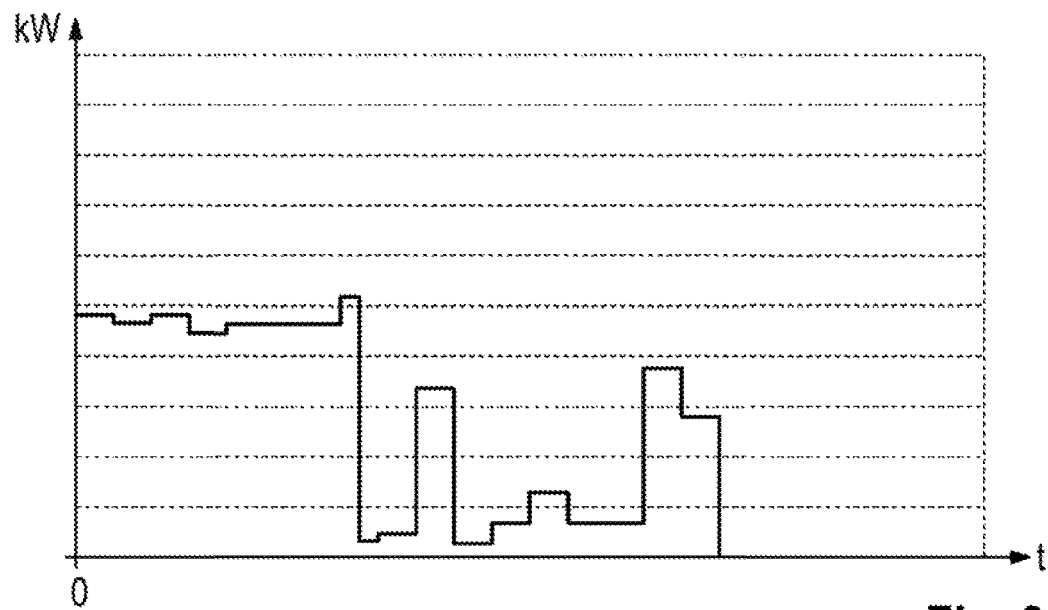
FIG. 3 shows a graphical illustration of a requirement information item in accordance with an exemplary embodiment of the present invention.

FIG. 1 depicts a home energy management system 1 in accordance with an exemplary embodiment of the present invention. The home energy management system 1 comprises a central unit 10 which is connected to at least one energy consumer 20. Here, the connection is carried out via a wired or wireless communication in accordance with an Internet-protocol based method or a bus system, for example via an intranet in this case. Such communication is symbolized by solid lines in accordance with the present illustration.

The energy consumer 20 is e.g. an electric vehicle. Here, the home energy management system comprises further energy consumers 20', 20'', 20''', and 20''''. By way of example, these can be a heat, pump 20', a refrigerator 20'', a washing machine 20''', and a dishwasher 20''''.

These energy consumers 20-20'''' are in turn connected to external services or systems 60-60'''', with the washing machine 20''' and the dishwasher 20'''' being connected together to an external system 60'''', in this case a home automation system (HAS). In order to elucidate that these systems are not part of the home energy management system per se, the corresponding connections have been embodied by dashed lines. By way of example, the electric vehicle 20 is connected to the Internet 60' via on-board systems, the heat pump 20' is connected to weather services 60'', and the refrigerator is connected to a further HAS 60'''.

The home energy management system 1 furthermore comprises an energy source 30, in this case a photovoltaic installation with a solar inverter, which is able to feed energy in the form of an electric current into the system.

It is also possible that the home energy management system 1 comprises units which act as an energy source 30 or as an energy consumer 20 depending on the situation. Within this meaning, these are therefore combined energy consumers and energy sources 23. Here, this may be a battery 23' which, depending on the energy supply state, feeds energy into the system or stores energy. Further, a smart meter 23 is provided in the present case, said smart meter being connected to an external energy supply system 60'''', for example a municipal power grid. The smart meter 23 feeds energy from the photovoltaic installation into the external energy supply system 60'''' and, on the other hand, supplies the home energy management system 1 with energy from this external system 60''''.

The central unit 10 itself may likewise be connected to external systems or services 60. By way of example, it may be supplied with information items about an available amount of energy and the associated price information items from such external systems 60.

Furthermore, further energy sources or energy consumers 50 are connected to the central unit 10 in this case. However, these are not capable of IP-based communication, as indicated by the double lines. In order also to include these energy consumers and/or sources into the system 1 according to aspects of the invention, or into the method according to aspects of the invention, the central unit measures the energy uptake and/or emission thereof and proceeds in accordance with the ascertained measurement values, with said central unit assigning amounts of energy to these systems 50 on the basis of predetermined prioritization criteria. Alternatively, it is conceivable that the further energy sources or energy consumers 50 are connected to an energy consumer 20 or an energy source 30, as a result of which the central unit is connected indirectly to the further energy sources and/or energy consumers, with which it communicates as described above.

FIG. 2 illustrates a graphical illustration of an information item in accordance with an exemplary embodiment of the present invention. Expediently, said information item is plotted here as a graph of an available amount of energy in kW over time, with the different prices being represented by different regions. The prices in cents per kWh specified here should be understood to be purely exemplary.

It can immediately be seen that there is a period of time in the center in which much energy is available at high prices and very little energy is available at low prices. Outside of these times, a substantially constant amount of energy is available at medium prices. Here, such a graph may relate, in particular, to a specific energy source 30.

Within the scope of the method according to aspects of the invention, the central unit 10 ascertains an information item for the entire home energy management system 1, wherein this information item can be represented in a form that is similar to the present illustration and, as a consequence, specifies all energy available at specific prices over time.

As a result, the information item comprises an amount of energy available at a specific price in relation to time. Additional information items, such as e.g. the source of a specific amount of energy, a $CO_2$ output connected with the amount of energy or a proportion of renewable energy in an amount of energy may likewise be contained, but these are not necessary and preferably not contained either. A person skilled in the art understands that the Integral over the graph specifies the overall amount of energy available.

FIG. 3 illustrates a graphical illustration of a requirement information item in accordance with an exemplary embodiment of the present invention. Here, the requested amount of energy in kW is plotted over time. In the present example, the assorted energy consumer 20 requires a substantially constant amount of energy at the start in this case, said amount of energy reducing over time. Toward the end of the depicted period of time, the energy consumer 20 no longer requires any energy.

Figure 4:
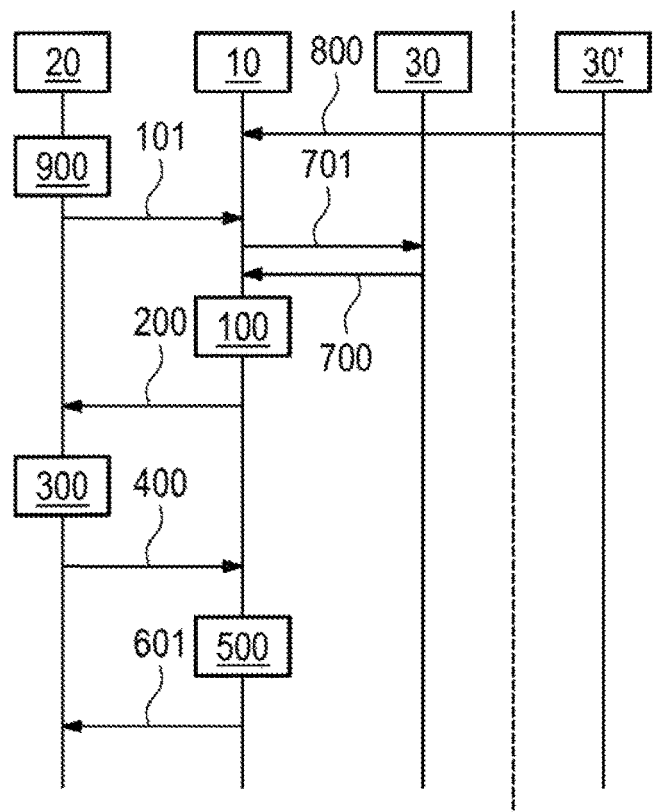
FIG. 4 shows a method in accordance with an exemplary embodiment of the present invention.

FIG. 4 illustrates a method in accordance with an exemplary embodiment of the present invention, Here, the method starts with an energy source 30', for example a public power grid, transmitting available amounts of energy at specific prices to a central unit 10 of the home energy management system 1 for a certain period of time in an eighth step 800.

In a ninth step 900, which can be carried out before, after or parallel with the eighth step 800, an energy consumer 20 of the home energy management system 1 determines the power required thereby, in particular for a predetermined period of time. Then, it directs a request 101 to the central unit 10 of the home energy management system 1 for an information item in respect of the available energy that relates to price and the predetermined period of time.

Thereupon, the central unit 10, in a seventh step 700, directs a request 701 to an energy source 30 that is situated in the home energy management system 1 in order to obtain a supply information item which, analogous to the information item, comprises an available price-encoded amount of energy for the predetermined period of time. The energy source 30 ascertains this supply information item in the seventh step 700 and transmits said supply information item to the central unit 10.

In a first step 100, the central unit 10 now ascertains the information item comprising price-encoded amounts of energy available in the predetermined period of time.

In a second step 200, the central unit 10 now transmits this information item to the energy consumer 20. In a third step 300, the latter ascertains a requirement information item taking into account the information item provided by the central unit 10 and the ascertained energy required, said requirement information item, in a manner analogous to the supply information item or the information item, comprising amounts of energy requested, or to be requested, at a specific price far the predetermined period of time.

In a fourth step 400, the energy consumer 20 transmits the requirement information item, which may also be referred to as energy request profile or consumption plan, to the central unit 10. In so doing, the consumer 20 indicates its willingness to, as it were, "sell" its stored energy or at least its consumption plan, like a battery. This second price information item may correspond to the tabular format outlined above but, instead of the overall available power and the price thereof, specifies the consumption envisaged by the consumer 20 and its willingness to change this plan in order, in turn, to offer the central unit 10 price incentives or even to provide its own energy supplies upon request.

In a fifth step 500, the central unit 10, on the basis of the transmitted requirement information items and taking into account the transmitted supply information items, now checks whether the overall requested amount of energy at any one time exceeds the amount of energy available at this time or whether the second price information item is inconsistent. This is not the case presently since there is only one energy consumer 20, whose requirement information item was of course ascertained taking into account the available amount of energy.

Therefore, the central unit 10 will transmit a confirmation information item to the energy consumer 20 in a sixth step 601 in this case, said confirmation information item signaling to the energy consumer 20 that the requested amount of energy is available. This should be considered tantamount to the central unit 10 transmitting an approval of the requirement information item to the energy consumer 20. In any case, what is decisive is that the energy consumer 20 now takes up energy from the home energy management system 1 in accordance with its requirement information item.

In accordance with an embodiment not depicted here, the home energy management system 1 comprises a plurality of energy consumers 20-20''''. What may occur in this case, in particular at busy times at which many energy consumers 20-20'''' request large amounts of energy, is that the check in the fifth step 500 yields that the overall requested amount of energy at at least one time exceeds the amount of energy available at this time. In this case, the method according to aspects of the invention is now carried out in an iterative form, wherein, however, the central unit replaces the first price information item underlying the information item, at least in part, by a third, and in this case higher price information item. To this end, the central unit combines the first price information item with the second price information item or consumption table, for example as returned by the first consumer 20, and transmits the result to the next requesting consumer 20'. The latter is consequently put into a position to, as it were, "buy" the consumption plan of the first consumer 20 at a price that has been set by the latter itself. On this basis, the second consumer 20' plans its own consumption and transmits its own "sales table" according to the aforementioned format back to the central unit 10, which continues the method until the negotiations have been completed. To this end, a sort of auction mechanism is introduced as each energy consumer 20 must now make a new decision as to whether it maintains the originally requested amounts of energy even when taking into account the higher, (virtual) third price information item or, for example, whether it requests lower amounts of energy. The decision as to whether a higher price is acceptable for an energy consumer 20 therefore lies exclusively with the latter and may depend on various parameters. Thus, a prioritization system may be predetermined for the energy consumer 20' or an energy consumer 20''' reduces its energy uptake at times with a high price.

It is clear here that the third price need not apply for the entire predetermined period of time, although this may well be the case. Thus, for example, it is possible that the energy demand only exceeds the energy supply at busy times and that a third price information item within the meaning of a higher virtual price is only applied at these times.

It is likewise possible within the scope of the method according to aspects of the invention that the energy source 30 also reacts to the change in the price and, for example, supplies higher amounts of energy and accordingly adapts the supply information item.

Finally, the central unit 10 can apply a sanction to the relevant consumer 20-20'''' in the case of a deviation from the returned sales plan. By way of example, the central unit 10 could force the consumer to pay for the energy reserved by the energy source 30 on account of the sales plan, even if this energy was not retrieved. This could be set at the full price, a fraction or a multiple thereof. It is likewise conceivable to charge a fixed fee or demote the infringing consumer 20-20'''' to the end of the "negotiation list" such that possible further renegotiations are initially established by the central unit 10 with all other consumers 20-20''''. In the latter case, the consumer 20-20'''' degraded in this manner could optionally, as it were, "buy back" his original tariff against payment of an increased price.

Here, the steps could, in part, also vary or be omitted, depending on the design of the home energy management system 1 and the situation.

What is claimed is:

1. A method for distributing energy in a home energy management system comprising a central unit, at least one energy source, and at least one energy consumer, wherein the central unit, the energy source, and the energy consumer are connected to one another for exchanging information items, the method comprising the steps of:
generating, by the energy source, a supply information item containing maximum amounts of energy that are providable for a predetermined period of time;
transmitting, by the energy source, the supply information item to the central unit;
generating, with the central unit, an information item which contains at least one first price information item and at least one first amount-of-energy information item for the predetermined period of time;
transmitting, by the central unit, the information item to the energy consumer;
ascertaining, by the energy consumer, a requirement information item taking into account the information item, said requirement information item containing at least one requested amount of energy for the predetermined period of time;
transmitting, by the energy consumer, the requirement information item and a second price information item to the central unit;
checking, by the central unit, whether the second price information item is consistent and whether the overall requested amount of energy ascertained from the transmitted requirement information items at any one time exceeds the amount of energy available at this time;
transmitting, by the central unit, an acknowledgment information item to the energy consumer if the second price information item is consistent and the overall requested amount of energy is less than or equal to the available amount of energy at all times, wherein the acknowledgment information item contains an information item regarding energy in accordance with the requirement information item being available for the energy consumer;
repeating the generating, ascertaining, and checking steps if the second price information item is inconsistent or the overall requested amount of energy is greater than the available amount of energy at any one time, wherein the central unit generates the information item such that it contains, at least in part, a third price information item, the third price information item different than the first price information item,
wherein the central unit takes the supply information item into account at least one of when generating the information item or when checking whether the second price information item is consistent and whether the overall requested amount of energy is inconsistent.

2. The method as claimed in claim 1, further comprising:
transmitting, by the energy consumer, a request for information to the central unit.

3. The method as claimed in claim 1, further comprising:
transmitting, by the central unit, a request for the supply information item to the energy source.

4. The method as claimed in claim 1, wherein at least one of the information item, the requirement information item, or the supply information item only contain at least one price information item and/or at least one amount-of-energy information item for the predetermined period of time.

5. The method as claimed in claim 1, further comprising:
ascertaining, by the energy consumer, the amount of energy to be requested, which forms the basis for the requirement information item and the second price information item.

6. The method as claimed in claim 1, wherein the amount of energy to be requested is in the form of a table of sale prices.

7. A home energy management system comprising:
a central unit;
at least one energy source; and
at least one energy consumer;
wherein the central unit, the energy source, and the energy consumer are connected to one another for exchanging information items; and
wherein the home energy management system is configured to carry out the method of claim 1.

8. The home energy management system as claimed in claim 7, wherein the home energy management system comprises an apparatus and wherein the apparatus comprises at least one of the central unit, the energy source, or the energy consumer.

9. A non-transitory computer-readable storage medium on which is stored a machine-readable program code, wherein the program code, when executed in a home energy management system, carries out the method of claim 1.

10. A non-transitory computer program product embodied on a computer-readable storage medium for distributing energy in a home energy management system wherein the non-transitory computer program product stores a computer program comprising a machine-readable program code, wherein the program code, when executed in a home energy management system, energy management system, carries out the method of claim 1.

* * * * *